United States Patent Office 3,156,712
Patented Nov. 10, 1964

3,156,712
PREPARATION OF 3β-HYDROXY-Δ⁴-20-KETOSTEROIDS FROM STEROIDAL Δ⁴-3,20-DIKETONES
Peter W. D. Mitchell, Mount Royal, Quebec, and David J. Marshall, Cote St. Luc, Quebec, Canada, assignors to American Home Products Corporation, New York, N.Y., a corporation of Delaware
No Drawing. Filed Sept. 5, 1961, Ser. No. 135,729
7 Claims. (Cl. 260—397.3)

This invention relates to a new and convenient method of converting steroidal Δ⁴-3,20-diketones to 3β-hydroxy-Δ⁴-20-ketosteroids valuable as progestational agents and as chemical intermediates for conversion to other steroidal compounds, and to new products produced by this method.

Suitable starting materials for our novel process are compounds having the formula

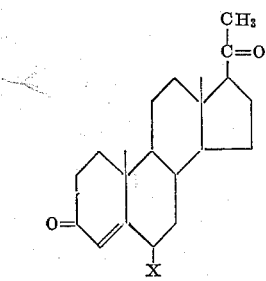

wherein X is hydrogen, methyl, chlorine, or fluorine. The process illustrated by the following reaction scheme:

In accordance with the foregoing scheme, progesterone (I, X=H), or a 6-substituted progesterone, is treated in a hot alcoholic solution with pyrrolidine to yield the enamine II. While the method as here shown and described employs pyrrolidine for the preparation of the enamine, it is to be understood that other cyclic secondary amines may be used instead, such as, for example, piperidine or morpholine; pyrrolidine, however, appears to give better results and is accordingly preferred.

The enamine II is then treated with semicarbazide in dilute aqueous acetic acid, whereby, surprisingly, it is converted almost quantitatively into the enamine semicarbazone III, even though it might have been expected that the enamine grouping would be split off and replaced by a semicarbazone group at position 3. Treatment with dilute alkali then hydrolyzes off the amine residue, giving a progesterone-20-semicarbazone (IV).

The progesterone-20-semicarbazone is stirred in a lower alkanol, suitably methanol, and treated at room temperature with sodium borohydride, whereby a 3β-hydroxy-Δ⁴-pregnene-20-one semicarbazone (V) is formed. This semicarbazone, when warmed with pyruvic acid or p-hydroxybenzaldehyde, is converted to a 3β-hydroxy-Δ⁴-pregnene-20-one (VI).

It will be seen that our method provides a simple and convenient means of selectively reducing the 3-keto group of a 3,20-dione by first blocking the 3-position by enamine formation, then blocking the 20-position by semicarbazone formation, then hydrolyzing off the 3-amino residue, reducing the 3-keto grouping, and then restoring the 20-keto function.

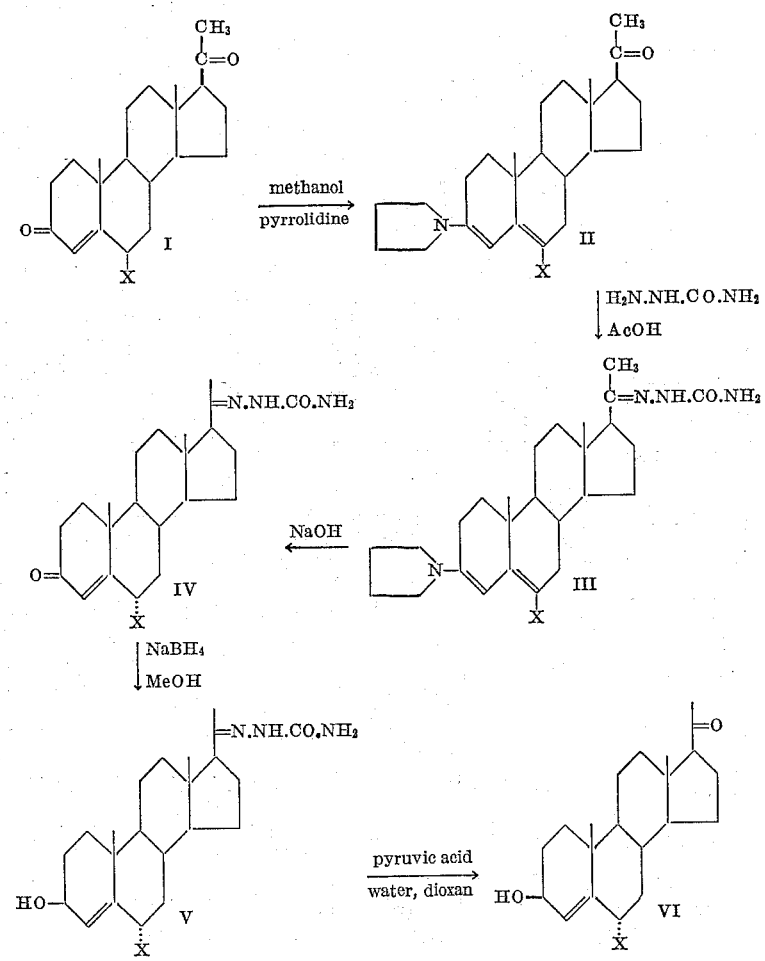

The following examples illustrate the practice of our invention:

EXAMPLE 1

*3-Pyrrolidino-$\Delta^{3,5}$-Pregnadiene-20-One*

Progesterone (20 g.) was dissolved in boiling methanol (400 ml.) and pyrrolidine (10 ml.) added to the hot solution. Crystallization of the product set in almost immediately and after the solution had been allowed to cool to room temperature, the product was separated.

It was washed with methanol and dried. Yield of pale yellow plates, M.P. 187–191° (d.) was 22.2 g. (95%). Heyl et al., J.A.C.S., 75, 1918, 1920 (1953) report 170–175 dec.

EXAMPLE 2

*Progesterone-20-Semicarbazone*

The enamine (22 g.) prepared according to Example 1 was dissolved at room temperature in acetic acid (22.2 ml.) and the solution diluted with water (1 litre). Semicarbazide (22 g.) was added and the solution kept for thirty minutes during which time a small amount of solid separated.

The solution was filtered through celite and the clear filtrate poured with stirring into water (600 ml.) containing 5% sodium hydroxide (330 ml.).

A pale pink solid was precipitated and after twenty minutes was separated by filtration and washed with water.

The product required no further purification before its use in the next step.

It may be crystallized from methanol (1 g. dissolved in about 40 ml. of hot methanol), and the product had M.P. 256–257° (d.).

Calculated for $C_{22}H_{33}N_3O_2$: N, 11.32%; found: N, 11.28 and 10.91%. U.V. absorption: $\lambda$ max. 235 m$\mu$, 306 m$\mu$; $\epsilon$ 29,600, 79.5.

EXAMPLE 3

*3$\beta$-Hydroxy-$\Delta^4$-Pregnene-20-One Semicarbazone*

The partially dried progesterone-20-semicarbazone of the previous example was stirred with methanol (1 litre) and sodium borohydride (10 g.) at room temperature. A clear solution was not obtained, but the solid changed in appearance to silky colorless platelets.

After two hours these were separated, washed with a little methanol, and dried. The product weighed 17.5 g. (74% based on progesterone) and had M.P. 261° (d.). U.V. absorption: $\lambda$ max. 228 m$\mu$; $\epsilon$ 17,300.

EXAMPLE 4

*3$\beta$-Hydroxy-$\Delta^4$-Pregnene-20-One*

The product of Example 3 (one gram) was stirred with dioxan (25 ml.), water (10 ml.), and pyruvic acid (0.5 ml.).

On raising the temperature to 90° C. over a period of ten minutes, a clear solution was obtained and this was allowed to cool slowly to 40° C. during one hour.

Water (70 ml.) was then added gradually with stirring and the crystalline solid thus obtained, separated by filtration.

The crude product (0.8 g., 94%) had M.P. 152–155° raised to 159–161° after one crystallization from aqueous methanol.

The melting point was undepressed on admixture with an authentic sample of 3$\beta$-hydroxy-$\Delta^4$-pregnene-20-one and the IR absorption curves were identical.

EXAMPLE 5

*6$\alpha$-Methylprogesterone 20-Semicarbazone*

To a solution of 6.6 g. of 6$\beta$-methylprogesterone [Burn, Ellis, Petrow, Stuart-Webb and Williamson (J. Chem. Soc. 1957, p. 4092)] in 33 ml. of warm methanol was added 4.3 ml. of pyrrolidine. On cooling, there was obtained 7.3 g. of enamine, M.P. 170–175° C.

To a solution of 2.00 g. of the enamine in 4 ml. of acetic acid was added 400 ml. of water and 0.40 g. of anhydrous semicarbazide. The mixture was allowed to stand at room temperature for one hour and was then filtered through a bed of filter aid. The filtrate was poured with stirring into a cold solution of 4 g. of sodium hydroxide in 40 ml. of water and the precipitated solid was filtered and washed with water. The wet solid was slurried with 25 ml. of warm methanol, and the suspension was cooled and filtered, yielding 6$\alpha$-methylprogesterone 20-semicarbazone as a methanol solvate, M.P. 219–220° C. with evolution of gas. Recrystallization from methanol gave an analytical sample, M.P. 222–223° C. (gas evolution), $[\alpha]_D + 113°$ (c.=1% in chloroform).

*Analysis.*—Calcd. for $C_{23}H_{35}N_3O_2 \cdot \frac{1}{2}CH_4O$: C, 70.30; H, 9.29; N, 10.47 Found: C, 70.37; H, 9.15; N, 10.59.

EXAMPLE 6

*3$\beta$-Hydroxy-6$\alpha$-Methyl-4-Pregnene-20-One*

A suspension of 11.7 g. of 6$\alpha$-methylprogesterone 20-semicarbazone in 250 ml. of methanol containing 4.5 g. of sodium borohydride was stirred for one hour in a water bath at 35° C. An additional 2.2 g. of sodium borohydride was then added and stirring was continued for 3.5 hours. Filtration yielded 7.3 g. of the semicarbazone of 3$\beta$-hydroxy-6$\alpha$-methyl-4-pregnen-20-one, M.P. 212–215° C.

A mixture of 0.53 g. of this semicarbazone, 13 ml. of dioxane, 2.5 ml. of water, and 0.42 ml. of pyruvic acid was warmed to about 40–50° C. for one-half hour until all of the solid had dissolved and the solution was then left overnight at room temperature.

Addition of 2.5 ml. of 5% sodium carbonate solution followed by 20 ml. of water gave an oil which slowly crystallized. Filtration and crystallization first from aqueous methanol and then from acetone-hexane gave 3$\beta$-hydroxy-6$\alpha$-methyl-4-pregnen-20-one, M.P. 132–134° C. $[\alpha]_D + 129°$ (c.=0.5% in chloroform).

*Analysis.*—Calcd. for $C_{22}H_{34}O_2$: C, 80.04; H, 10.38. Found: C, 80.32; H, 10.28.

This compound has progestational activity when adminstered either subcutaneously or orally and, in addition, has a longer duration of action than progesterone.

The acetate was crystallized from aqueous methanol, M.P. 129–133° C. $[\alpha]_D + 65°$ (c.=1% in chloroform).

We claim:

1. A process for preparing 3$\beta$-hydroxy-$\Delta^4$-20-keto-steroids which comprises the steps of: (1) adding pyrrolidine to a solution of a steroidal $\Delta^4$-3,20-diketone in a lower alkanol, and recovering a 3-pyrrolidino-$\Delta^{3,5}$-steroidal 20-ketone; (2) adding semicarbazide to an acidified solution of said 3-pyrrolidino-$\Delta^{3,5}$-steroidal-20-ketone to form an acidic solution of a 3-pyrrolidino-$\Delta$-$^{3,5}$-steroidal-20-semicarbazone, commingling said acidic solution with an excess of dilute aqueous alkali metal hydroxide solution, recovering a 3-keto-$\Delta^4$-steroidal-20-semicarbazone; (3) agitating said semicarbazone in a lower alkanol with sodium borohydride and thereafter recovering a 3$\beta$-hydroxy-$\Delta^4$-steroidal-20-semicarbazone; (4) preparing a solution of said 3$\beta$-hydroxy-$\Delta^4$-steroidal-20-semicarbazone in a water-miscible non-alcoholic solvent, adding thereto pyruvic acid, and thereafter diluting the reaction mixture with water to cause separation of the 3$\beta$-hydroxy-$\Delta^4$-steroidal-20-ketone, and recovering said 3$\beta$-hydroxy-$\Delta^4$-steroidal-20-ketone.

2. A process according to claim 1 in which the steroidal starting material is progesterone.

3. A process according to claim 1 in which the steroidal starting material is 6-methylprogesterone.

4. A process according to claim 1 in which the lower alkanol is methanol and in which the water-miscible non-alcoholic solvent is dioxan.

5. 3$\beta$-hydroxy-$\Delta^4$-pregnene-20-one semicarbazone.

6. 6$\alpha$-methylprogesterone-20-semicarbazone.

7. 3β-hydroxy-6α-methyl-4-pregnen-20-one-semicarbazone.

References Cited in the file of this patent

FOREIGN PATENTS

| | | |
|---|---|---|
| 802,004 | Great Britain | Sept. 24, 1958 |
| 802,005 | Great Britain | Sept. 24, 1958 |
| 809,046 | Great Britain | Feb. 18, 1959 |

OTHER REFERENCES

Seyle: Endrocrinology, Universite de Montreal, Montreal, Canada (1947), pp. 914.

Gut: J. Org. Chem., vol 21, pp. 1327–1328 (1956).

Loewenthal: Tetrahedron, vol. 6, No. 4, June 1959, pp. 269–303 (pages 282–285 and 293–294 depended upon).

Narasimha et al.: J. Org. Chem. 26, 16–7–1608, May 1961.